United States Patent Office 3,830,877
Patented Aug. 20, 1974

3,830,877
COPOLYALKENAMERS HAVING A SEQUENTIAL STRUCTURE, AND METHOD FOR PREPARING SAME
Gino Dall' Asta, San Giuliano Milanese, and Giuseppe Motroni, Milan, Italy, assignors to Montecatini Edison S.p.A. Milan, Italy
No Drawing. Filed Aug. 1, 1972, Ser. No. 277,120
Claims priority, application Italy, Aug. 2, 1971, 27,061/71
Int. Cl. C08f 17/00
U.S. Cl. 260—875
7 Claims

ABSTRACT OF THE DISCLOSURE

There are disclosed new high molecular weight copolyalkenamers the chains of which are made up of two or more more alternating types of monomeric units arranged according to either homo-sequences or both homo-sequences and hetero-sequences (which is to say sequences made up of statistically distributed monomeric units). Also disclosed is a method of preparing the new copolyalkenamers by reacting a homopolyalkenamer, preferably dissolved in a suitable solvent, with one or more cycloolefins (other than the one making up the starting homopolyalkenamer) in contact with a particular catalytic system prepared from a transition metal salt such as a tungsten salt; preferably but not necessarily an oxygenated compound such as molecular oxygen; and a derivative of a metal belonging to Groups I, II, III or IV of the Mendelyeev Periodic Table, such as, for instance, a hydride or organometallic compound of aluminum.

THE PRIOR ART

Homopolymers having the structure of polyalkenamers and obtained by homopolymerization of cycloolefins have been described in, for instance, Italian Pats. Nos. 701,182, 733,857; and 778,370 assigned to the present assignee, Montecatini Edison, S.p.A. Another Italian patent, No. 773,657, to the same assignee, also describes copolymers exhibiting a copolyalkenameric structure, having a random (statistical) and nonsequential distribution of the units deriving from the monomers, and obtained by the copolymerization of two or more cycloolefins.

THE PRESENT INVENTION

An object of this invention was to provide a new class of copolyalkenamers consisting of high molecular weight polymeric chains along which two or more types of monomeric units alternate and which are arranged in either long homo-sequences or in both homo-sequences and hereto sequences, i.e., sequences made up of statistically distributed monomeric units.

This and other objects are achieved by the method referred to in the Abstract Of Disclosure, supra.

The alkenameric monomeric units in our new copolyalkenamers correspond to the following general formula:

(1)  $-CH=CH(CH_2)_m-$ wherein $m$ is a whole number selected from 2, 3, 5, 6, 7, 8, 9 and 10.

In the sequential copolyalkenamers, which are the object of the present invention, said monomeric units form homosequences corresponding to the general formula (2):

(2)  $[-CH=CH(-CH_2)_m]_z$ wherein $z$ is the mean length of the homosequences expressed as monomeric units and being a whole number generally comprised between 5 and 1000, preferably between 10 and 300. Small amounts of homosequences, in a quantity not higher than 10% of the copolymer's total sequences, may have — in some cases—a number $z$ lower than 5 or higher than 1000.

The polymeric chains constituting our sequential copolyalkenamers are therefore characterized—when only homosequences are present in said chains—by the following general formula (3):

(3)  $[-CH=CH(-CH_2)_m]_z[-CH=CH(-CH_2)_{m'}]_{z'}$
     $[-CH=CH(-CH_2)_{m''}]_{z''}$ wherein $m'$, $m''$, and $z'$, $z''$, have the values indicated hereinbefore respectively for $m$ and $z$.

The ratio between the various types of alkenameric units is generally comprised between 5 and 90% of a type of alkenameric units with respect to the polymer total.

Besides the structures indicated in formula (3), the sequential copolyalkenamers according to the present invention may contain also small amounts, not higher than 15% of the total copolymer, of other monomeric units, such as those deriving from the copolymerization with alkyl-substituted cycloolefins (for instance 3-methylcyclopentene) or with bicycloolefins (for instance norbornene). Chain end groups not derived from cycloolefins may be present too, such as those which form when the molecular weight of the copolymer is regulated by preparing it in the presence of acyclic olefins or acyclic dienes.

We have found, and this is another object of our invention, that it is possible to prepare sequential copolyalkenamers corresponding, when formed only by homosequences, to general formula (3). Like the copolyalkenamers having a random distribution, also the sequential copolyalkenamers are generally crystalline, particularly when the double bonds contained therein are essentially of one single type, for example cis-type or trans-type. Owing to the particular distribution of the monomeric units, the sequential copolyalkenamers according to this invention exhibit—the compositions being equal—degrees of crystallinity and melting temperatures higher than those of the corresponding copolyalkenamers having a random distribution.

A further surprising aspect of the copolyalkenamers according to this invention consists in that they have more than one melting point, as the various types of sequences melt at different temperatures.

Such features result in improved utility of the sequential copolymers for certain purposes, in particular when the production of elastic fibers or elastomers for special uses is desired.

Sequential copolyalkenamers according to the present invention are, for example, those containing sequences of monomeric units selected from butenamer ($m=2$), pentenamer ($m=3$), heptenamer ($m=5$), octenamer ($m=6$), nonenamer ($m=7$), decenamer ($m=8$), undecenamer ($m=9$) and dodecenamer ($m=10$), having double bonds prevailingly of the cis-type or trans-type. Preferred examples are those containing sequences of monomeric units selected from butenamer, pentenamer, heptenamer, octenamer, decenamer and dodecenamer.

The preferred copolymers are those which contemporaneously contain sequences of butenamer and pentenamer, of pentenamer and octenamer, of pentenamer and dodecenamer, of heptenamer and dodecenamer or of octenamer and dodecenamer. Moreover, the preferred copolyalkenamers of the above said types are those in which the double bonds are prevailingly of the trans-type.

These new sequential polyalkenamers can be prepared from the homopolyalkenamer, by reacting it, preferably dissolved in a suitable solvent, with one or more cycloolefins other than the one making up the homopolyalkenamer, in the presence of a catalyst as disclosed herein. Analogously, it is also possible to use, instead of the homopolyalkenamer, a statistical copolyalkenamer and to react it with cycloolefin. It is also possible to start from a sequential copolyalkenamer according to this invention and to react it with a cycloolefin other than those forming the starting copolyalkenamer.

The catalysts employed to bring about said reaction are those which have been described in, for instance, Italian Patent No. 778,370. Said catalysts are obtained by mixing:

(A) a salt of a transition metal selected from tungsten, molybdenum, rhenium, tantalum, niobium, titanium and zirconium;
(B) preferably, but not necessarily, an oxygenated compound containing at least one O—O, O—H, C=O, C—O—C or N=O bond; and
(C) a metal hydride, an organometallic compound, a halide or amide of metal belonging to any of the 1st, 2nd, 3rd or 4th groups of the Periodic Table according to Mendelyeev.

Examples of useful transition metals salts (catalytic component A) are $WCl_6$, $WCl_5$, $WBr_5$, $WF_6$, $WOBr_4$, $WCl_5(OR)$, $WCl_4(OR)_2$, $WOCl_4$ (wherein R is an alkyl or haloalkyl group), $WCl_4$, $WCl_2$, $W(allyl)_4$, $W(acetylacetonate)_3$, $MoCl_4$, $MoOCl_3$, $MoBr_5$, $MoO=(acetylacetonate)_2$, $TaCl_5$, $NbCl_5$, $ReCl_6$, $ReCl_5$, $TiCl_4$, $ZrCl_4$. Presently preferred transition metal salts are $WCl_6$, $WOCl_4$, $WF_6$ and $MoCl_5$.

Useful oxygenated compounds (catalytic component (B)) which may be used are, for instance, molecular oxygen, water, alcohols, halogenated alcohols, epoxides, ethers, acetals, carbon dioxide, hydroperoxides, organic and inorganic peroxides, nitrobenzene derivatives. Presently preferred examples of these compounds are molecular oxygen, water, ethanol, betachloroethanol, ethylene oxide, propylene oxide, epichlorhydrin, cumyl hydroperoxide, cyclopentene hydroperoxide, benzoyl peroxide, cumyl peroxide, tert. butyl peroxide and carbon dioxide.

Examples of metal compounds useful as catalyst component (C) are, in particular, organometallic compounds, hydrides, amides and halides of the following metals: aluminum, magnesium, lithium, beryllium, zinc, mercury, calcium boron, tin and lead.

Specific examples thereof are triaryl-aluminum, trialkyl-aluminum, dialkyl-aluminum monohalides, alkyl-aluminum dihalides, aluminum trihalides, complexes of aluminum trihalides with a Lewis base (such as, for instance, anisole), dialkyl-aluminum monohydrides, aluminum trihydride, aluminum triamide, magnesium diaryl, magnesium dialkyl, aryl-magnesium halides, alkyl-magnesium halides, magnesium diamide, magnesium dihalides, lithium alkyl, lithium aryl, beryllium dialkyl, zinc dialkyl, zinc diaryl, calcium dialkyl, boron trihalides, tin tetralkyl, dialkyl tin dihydrides, tin tetrahalides and lead tetralkyl.

Preferred examples of said compounds (C) are aluminum triethyl, aluminum triisobutyl, diethyl-aluminum chloride, diisobutyl-aluminum chloride, ethyl-aluminum dichloride, aluminum trichloride, aluminum tribromide, diethyl-magnesium, diphenyl-magnesium, butyl-magnesium bromide, lithium butyl, zinc dibutyl, dibutyl-tin dichloride.

Catalytic component (B) is preferably added to component (A) before admixing component (C). The addition of (B) to (A) is preferably carried out in any of the solvents specified hereinbelow.

The ratio between component (A) and component (B) is usually selected from molar ratios ranging from 1:0.1 to 1:10, preferably from 1:0.2 to 1:2. The ratio between component (A) and component (C) is usually selected from a range of molar ratios comprised between 1:0.3 and 1:50, preferably between 1:0.5 and 1:20.

Preparation of the catalytic mixture and the successive copolymerization reaction are preferably conducted in an inert gas atmosphere, such as, for instance, nitrogen or argon.

Preparation of the catalyic mixture and the subsequent copolymerization reaction are preferably carried out in a solvent capable of dissolving the polyalkenamer. Suitable solvents are hydrocarbons or halogenated hydrocarbons. Preferred examples thereof are benzene, toluene, cyclohexane, n-heptane and chlorobenzene. The amount of solvent to be employed can be selected from polyalkenamer/solvent weight ratios ranging from 1:1 to 1:100, preferably from 1:10 to 1:50.

For the reaction with the cycloolefin, instead of using any of the solvents specified hereinabove, it is possible also to employ as a solvent the cycloolefin itself. In this case the starting polyalkenamer is dissolved in the cycloolefin selected for the reaction, the catalytic components being then added to the solution.

The reaction is usually conducted at temperatures comprised between —50 and +80° C., preferably between —30 and +50° C.

The reaction may be illustrated as follows (A representing the monomeric units of the starting homopolyalkenamer, B representing the cycloolefin molecules):

A-A-A-A-A-A-A-A-A-A-A-A-A-A-A (starting homopolyalkenamer)

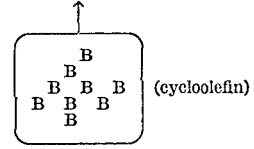

A-A-A-A-A-A-B-B-B-B-B-B-A-A-A-A-A-A-A (sequential copolyalkenamer resulting therefrom)

In a presently preferred embodiment of the invention, the starting homopolyalkenamer is 1,4-polybutadiene (polybutenamer), polypentenamer, polyoctenamer, polydecenamer, or polydodecenamer. Said polymers can be linear with end groups due to molecular weight modifiers or can have the structure of macrocycles, in which no end groups are present.

The cycloolefins to be introduced into the polymeric chain are usually selected from cyclopentene, cycloheptene, cyclooctene, cyclononene, cyclodecene, cycloundecene and cyclododecene, 1,5-cyclooctadiene, 1,5-cyclodecadiene and 1,5,9-cyclododecatriene. The preferred cycloolefins are cyclopentene, cycloheptene, cyclooctene, cyclododecene and 1,5-cyclooctadiene.

The ratio between starting polyalkenamer and cycloolefin (or cycloolefins) to be introduced into the chain is generally selected from 1:0.2 to 1:100, preferably from 1:0.5 to 1:20 (parts by weight).

The molecular weight of the starting polyalkenamer is suitably selected in the range comprised between 10,000 and 2,000,000, preferably between 20,000 and 1,000,000. In order to regulate the sequential copolyalkenamer molecular weight, small amounts of an acyclic olefin or of an acyclic diene can be added at the rate of 0.001–1 mol-percent, preferably of 0.005–0.5 mol-percent, with respect to the basis moles of polyalkenamer can be added to the reaction mixture.

The following examples are given to illustrate the present invention, without however, being intended as limitative.

EXAMPLE 1

10 g. of trans-polypentenamer (having vinyl and propenyl end groups originating from the modifications of the molecular weight with 1-butene; double bonds which are for 85% of the trans-type and for 15% of the cis-type; and an intrinsic viscosity in toluene at 30° C. of 1.8 dl./g.); and 300 ml. of anhydrous cyclohexane, are introduced, in dry nitrogen atmosphere, into a three-necked flask, provided with stirrer, nitrogen inlet and reagents inlet.

The whole is stirred until the polymer is dissolved; under strong stirring, the following are mixed with the solution:

0.5 millimoles (10 ml. of a 0.05 molar benzene solution) of tungsten hexachloride;
0.5 millimoles of anhydrous ethanol; and after cooling to 0° C.,
2.5 millimoles of diethyl-aluminum chloride, and
80 ml. of anhydrous cyclooctene.

The resulting mass is slowly brought to 20° C. and is kept under strong stirring for 10 hours.

The reaction is interrupted by adding 10 ml. of a benzene:methanol:N-phenyl-beta-naphthylamine mixture in a 50:10:1 (by weight) ratio. The polymer is precipitated by pouring the mixture into 1500 ml. of methanol. The polymer is separated and dried. It is dissolved again in 200 ml. of benzene and is precipitated once more with 1 liter of methanol. The purified polymer is dried under vacuum at room temperature.

15 g. of a white, solid and elastic sequential copolyalkenamer are thus obtained, the composition of which (determined by the radiochemical analysis) corresponds to 61% by weight of pentenameric units and to 39% by weight of octenameric units. The double bonds are for 80% of the trans-type and for 20% of this cis-type. The intrinsic viscosity in toluene at 30° C. is 1.5 dl./g. The roentgen-ray analysis shows the absence of homopolymer. The partial ozonization and subsequent reductive demolition of the ozonides shows that the copolymer consists of octenamer and pentenamer sequences having a mean length of about 20 monomeric units. The polymer has two transitions of the first order at approximately 10° C. and 45° C.

EXAMPLE 2

Example 1 is repeated, except that 40 ml. of cyclooctene instead of 80 ml. are used.

12 g. of a white, solid, elastic sequential copolyalkenamer are obtained, consisting for 78% by weight of pentenameric units and for 22% by weight of octenameric units. The double bonds are for 80% of the trans-type and for 20% of the cis-type. The intrinsic viscosity in toluene at 30° C. is 1.7 dl./g.

The structure of this sequential copolyalkenamer is determined as described in Example 1. The mean length of the pentenameric sequences is of about 40 monomeric units, while the mean length of the octenameric sequences is of about 10 monomeric units.

EXAMPLE 3

20 g. of polyheptenamer (having a structure like that of the polypentenamer of Example 1),
120 ml. of anhydrous cyclododecene,
1 millimole of WCl$_6$,
0.6 millimoles of benzoyl peroxide, and
4.8 millimoles of ethyl-aluminum dichloride are introduced into equipment as described in Example 1 and according to the same method.

The reaction is conducted for 12 hours at 40° C. and the polymer is purified as described in Example 1.

14 g. of a white, solid, fibrous sequential copolymer are obtained, consisting for 45% by weight of dodecenameric units and for 55% by weight of heptenamer units. The double bonds are for 80% of the trans-type and for 20% of the cis-type. The intrinsic viscosity in toluene at 30° C. is 1.2 dl./g. The sequential structure is determined as in Example 1. The mean length of the sequences is of about 30 monomeric units.

EXAMPLE 4

The sequential copolymer of Example 2 is vulcanized with the following recipe (pcp.=parts percent by weight of copolymer):

|  | Pcp. |
|---|---|
| Copolymer of Example 2 | 100 |
| Phenyl-beta-naphthylamine | 1 |
| Stearic acid | 2 |
| Zinc oxide | 5 |
| Carbon black HAF | 50 |
| Sulphur | 1.5 |
| Mercaptobenzothiazole disulphide | 1 |

Vulcanization is carried out at 150° C. for 40 minutes, and an elastic rubber having the following characteristics (at 23° C.) is thus obtained:

Tensile strength: 295 kg./cm.$^2$
Elongation at break: 430%.
Elastic modulus at 300%: 170 kg./cm.$^2$
Tearing resistance: 46 kg./cm.

This rubber can be used for the manufacture of various industrially useful articles, in particular for gaskets.

The sequential copolyalkenamers of the invention can be vulcanized with the aid of conventional vulcanizing recipes and used for various purposes, including the production of elastic fibers and other elastic articles.

As will be apparent, various changes in details can be made in practicing the invention, without departing from its spirit. Therefore, we intend to include in the scope of the appended claims all modifications which will be obvious to those skilled in the art from the description and illustrative working examples given herein.

We claim:
1. Copolyalkenamers having a high molecular weight and a sequential structure, consisting of polymeric chains along which two or more types of monomeric alkenameric units, arranged in sequences, alternate, at least one of such units being present in the form of long homosequences generally comprising 5 to 1000 monomeric units, said monomeric units having the general structure:

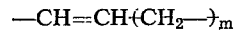

wherein $m$ is a whole number selected from 2, 3, 5, 6, 7, 8, 9 and 10, and the chain being made up for at least 85% by weight of homosequences or of homosequences and heterosequences (sequences consisting of statistically distributed monomeric units).

2. Copolyalkenamers having a sequential structure according to claim 1, essentialy consisting of polypentenamer homosequences alternated with polyoctenamer homosequences.

3. Copolyalkenamers having a sequential structure according to claim 1, essentially consisting of polyheptenamer homosequences alternated with polydodecenamer homosequences.

4. Elastomeric products obtained by vulcanization of copolyalkenamers having a sequential structure according to claim 1.

5. Process for preparing the copolyalkenamers having a sequential structure according to claim 1, which comprises reacting a preformed homopolyalkenamer or a copolyalkenamer having a statistical or sequential structure, preferably dissolved in a suitable solvent, at a temperature ranging from —50° C. to +80° C., with one or more cycloolefins other than that or those constituting the homopolyalkenamer or the copolyalkenamer, in the presence of a catalytic system obtained by mixing
(A) a salt of a transition metal selected from the group consisting of tungsten, molybdenum, rhenium, tantalum, niobium, titanium and zirconium;
(B) preferably, but not necessarily, an oxygenated compound containing at least one O—O, O—H, C=O, C—O—C or N=O bond; and
(C) derivative of a metal belonging to Groups I, II, III or IV of the Mendelyeev Periodic Table and selected from the group consisting of organometallic compounds, hydrides, amides and halides of said metals;

the molar ratio between component A and component B being comprised between 1:0.1 and 1:10, and the molar ratio between component A and component C ranging from 1:0.3 to 1:50.

6. Process according to claim 5, in which the catalytic system consists of tungsten hexachloride, anhydrous ethanol and aluminum-diethyl chloride.

7. Process according to claim 5, in which the catalytic system consists of tungsten hexachloride, benzoyl peroxide and aluminum-ethyl dichloride.

References Cited
UNITED STATES PATENTS

| | | | |
|---|---|---|---|
| 3,502,626 | 3/1970 | Dall'Asta et al. | 260—80.78 |
| 3,707,520 | 12/1972 | Pampus et al. | 260—879 |
| 3,449,310 | 6/1969 | Dall'Asta et al. | 260—93.1 |
| 3,458,489 | 7/1969 | Natta et al. | 260—93.1 |
| 3,459,725 | 8/1969 | Natta et al. | 260—93.1 |
| 3,476,728 | 11/1969 | Natta et al. | 260—93.1 |
| 3,639,371 | 2/1972 | Marshall et al. | 260—93.1 |
| 3,657,208 | 4/1972 | Judy | 260—93.1 |
| 3,684,781 | 8/1972 | Nutzel et al. | 260—93.1 |
| 3,689,471 | 9/1972 | Judy | 260—82.1 |
| 3,692,760 | 9/1972 | Witte et al. | 260—93.1 |
| 3,719,652 | 3/1973 | Oberkirch et al. | 260—93.1 |

JOSEPH L. SCHOFER, Primary Examiner
A. HOLLER, Assistant Examiner

U.S. Cl. X.R.

260—79.5 B, 82.1, 88.2, 93.1, 879